United States Patent [19]

Sakai et al.

[11] Patent Number: 4,844,221
[45] Date of Patent: Jul. 4, 1989

[54] CONTROL SYSTEM OF A SELECTOR MECHANISM FOR A CONTINUOUSLY VARIABLE TRANSMISSION

[75] Inventors: Yasuhito Sakai, Higashimurayama; Yoichi Iijima, Musashino, both of Japan

[73] Assignee: Fuji Jukogyo Kabushiki Kaisha, Tokyo, Japan

[21] Appl. No.: 114,545

[22] Filed: Oct. 28, 1987

[30] Foreign Application Priority Data

Oct. 31, 1986 [JP] Japan .................. 61-261001

[51] Int. Cl.$^4$ .................. B60K 41/22; F16D 47/00
[52] U.S. Cl. .................. 192/3.56; 192/3.58; 192/30 W; 192/48.5; 192/48.7; 192/51
[58] Field of Search .................. 192/0.092, 3.56, 48.5, 192/51, 30 W, 48.7, 3.58, 3.57; 74/335, 866

[56] References Cited

U.S. PATENT DOCUMENTS

| | | | |
|---|---|---|---|
| 4,459,872 | 7/1984 | Tibbles | 74/335 |
| 4,466,521 | 8/1984 | Hattori et al. | 192/0.092 |
| 4,612,828 | 9/1986 | Ide et al. | 74/866 |
| 4,690,011 | 9/1987 | Sakai et al. | 192/4 A |

FOREIGN PATENT DOCUMENTS 0151024 8/1985 European Pat. Off.
60-159452 8/1985 Japan.

Primary Examiner—Leslie A. Braun
Assistant Examiner—David A. Testardi
Attorney, Agent, or Firm—Martin A. Farber

[57] ABSTRACT

A control system for a selector mechanism for a vehicle provided with a clutch and a continuously variable transmission having operational ranges such as a driving range and a reverse range. A synchronizer is provided for selecting either of forward and reverse gears. A hydraulic actuator is provided to respond to the operation of a selector lever for operating the synchronizer for the selection of the ranges. A shift switch is provided to produce a shift signal when the synchronizer engages with a selected gear. A control unit is provided to respond to the shift signal to engage the clutch after the engagement of the synchronizer.

4 Claims, 8 Drawing Sheets

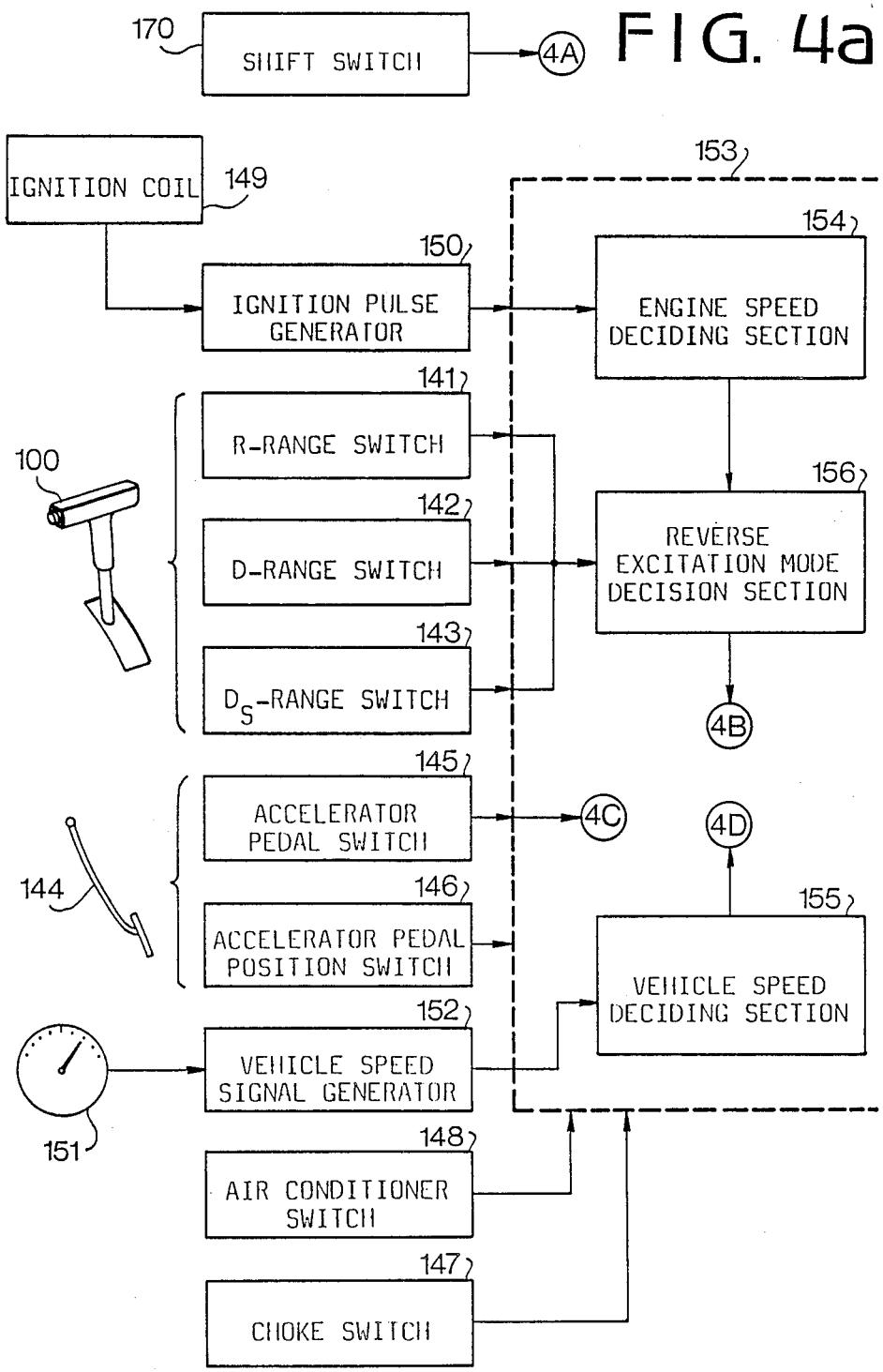

CONTROL SYSTEM OF A SELECTOR MECHANISM FOR A CONTINUOUSLY VARIABLE TRANSMISSION

BACKGROUND OF THE INVENTION

The present invention relates to a selector mechanism for a continuously variable belt-drive automatic transmission for a vehicle, and particularly to a mechanism for performing the selection of operational ranges of the automatic transmission.

A known continuously variable belt-drive transmission (called hereinafter CVT) comprises an endless belt running over a drive pulley and a driven pulley. Each pulley comprises a movable conical disc which is axially moved by a fluid operated servo device so as to vary the running diameter of the belt on the pulleys in dependence on driving conditions. Further, a selector mechanism is provided for selecting operational ranges such as a drive range (D), high engine speed drive range (Ds), reverse range (R), neutral range (N), and parking range (P). The selection of these ranges are performed by manipulating a selector lever. Thus, a driving position (D range) and a reverse driving position (R range), neutral position and parking position are provided for the selector lever.

European Patent Application EP-A-0 151 024 discloses a CVT in which a selector mechanism having a synchromesh mechanism is provided between an electromagnetic clutch and an input shaft of a belt and pulley device. The selector mechanism has a manually operated selector lever mechanically connected thereto through a link mechanism.

In order to reduce the shifting effort, there has been proposed a selector mechanism operated by a hydraulic actuator which is connected to the selector lever. When the selector lever is operated, the actuator operates to shift a part of the synchromesh mechanism such as a fork or sleeve to engage the synchromesh mechanism. In such a system, the selector lever can be operated regardless of the engagement of the synchromesh mechanism.

Generally, the CVT is so arranged that when the selector lever is shifted from the neutral position to the driving position and to the reverse position, drag current flows in a magnetizing coil of the electromagnetic clutch to apply drag torque to the drive pulley to remove clearances in the transmission.

On the other hand, it may occur that, when shifting the selector lever, time elapses before the sleeve of the synchromesh mechanism engages with a corresponding gear in synchronism with it. Accordingly, it may happen that the electromagnetic clutch engages before the engagement of the synchromesh mechanism. When the electromagnetic clutch engages, the drag torque is applied. Therefore, it is difficult to engage the synchromesh mechanism. Further, the selector lever may be shifted to the neutral position during driving of the vehicle and shifted again to the driving position. In such a case, the actuator fails to engage the synchromesh mechanism, because of a large difference between the speeds of the sleeve and the corresponding gear.

SUMMARY OF THE INVENTION

The object of the present invention is to provide a selector mechanism which is operated by an actuator without failure in engagement of a synchromesh mechanism.

The other objects and features of this invention will become understood from the following description with reference to the accompanying drawings.

BRIEF DESCRIPTION OF DRAWINGS

FIGS. 4a and 4b show a block diagram showing a control unit for an electromagnetic clutch.

DETAILED DESCRIPTION OF THE PREFERRED EMBODIMENT

Figure 1A:
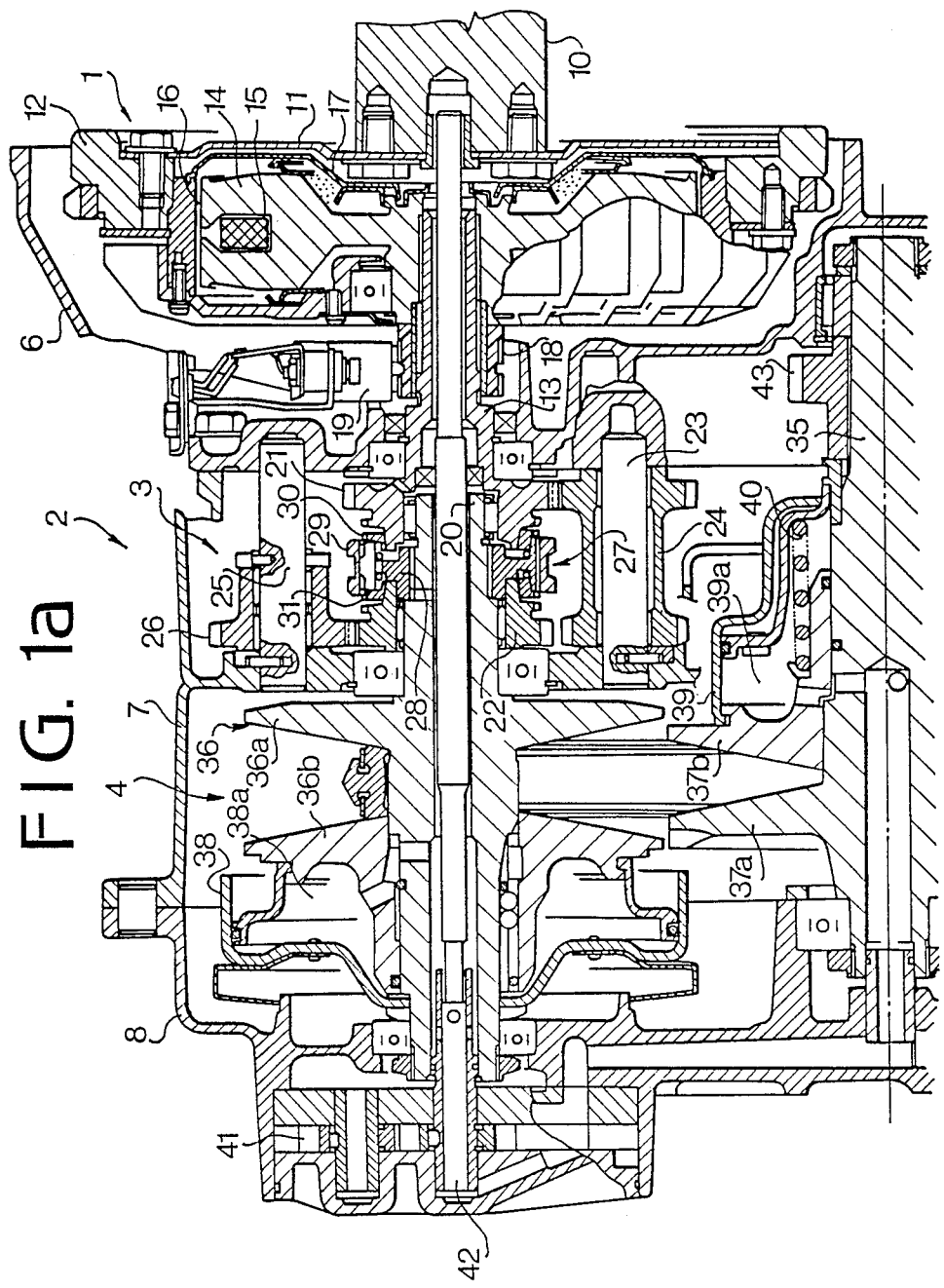
FIGS. 1a and 1b show a continuously variable belt-drive transmission to which the present invention is applied.
Figure 1B:
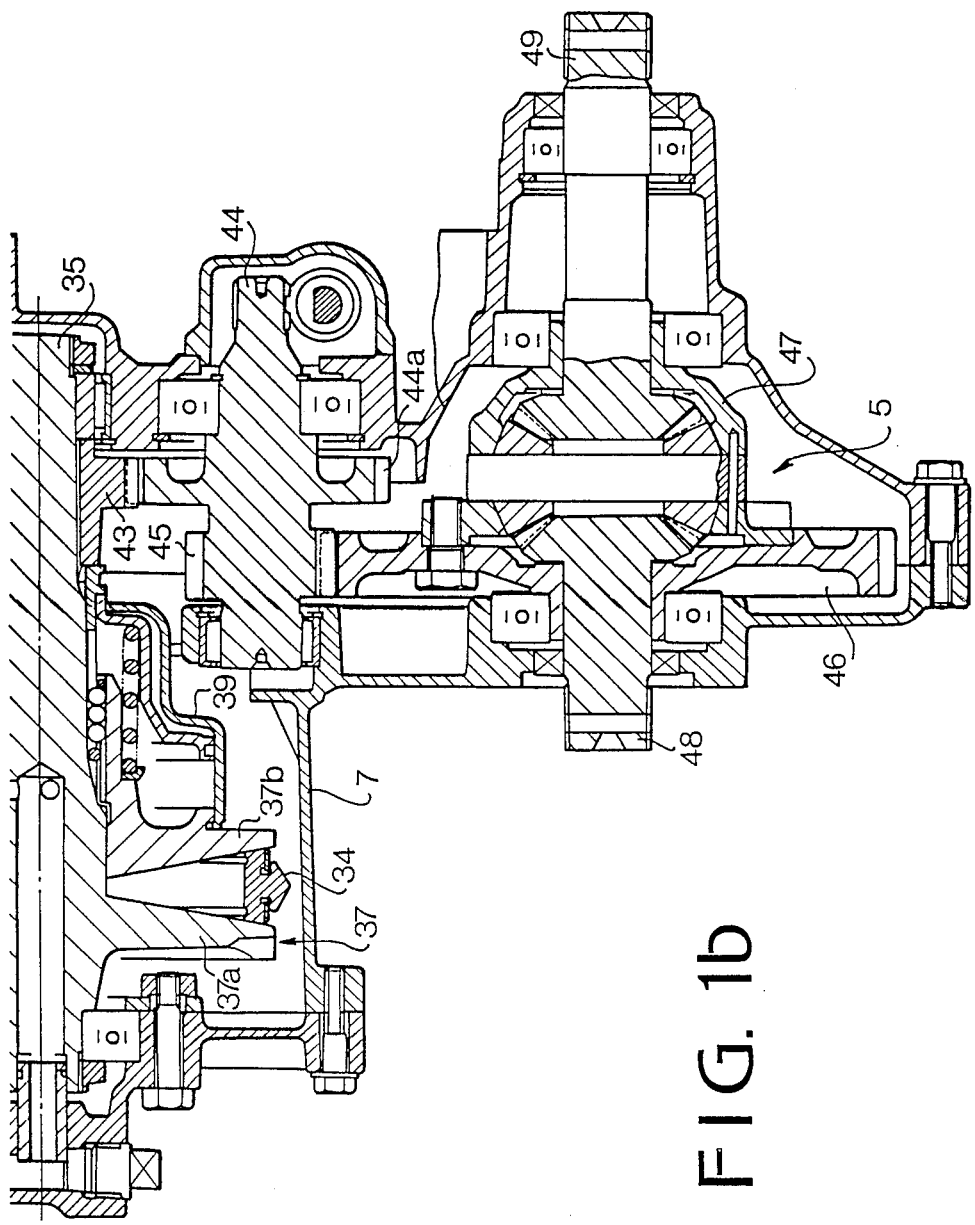

Referring to FIGS. 1a and 1b, a continuously variable belt-drive automatic transmission for a vehicle, to which the present invention is applied, comprises an electromagnetic powder clutch 1, and a continuously variable belt-drive transmission 2. The CVT 2 has a selector device 3, pulleys and belt device 4, and final reduction device 5. The electromagnetic powder clutch 1 is provided in a housing 6, and the selector device 3, pulleys and belt device 4 and final reduction device 5 are provided in a main housing 7 and a side housing 8. A crankshaft 10 of an engine (not shown) is connected to an annular drive member 12 through a drive plate 11 of the electromagnetic powder clutch 1.

The electromagnetic powder clutch 1 comprises a driven member 14, and a magnetizing coil 15 provided in the driven member 14. The driven member 14 has its outer periphery spaced from the inner periphery of the drive member 12 by a gap 16, and a powder chamber 17 is defined between the drive member 12 and driven member 14. Magnetic powder material is provided in the powder chamber 17. The driven member 14 is secured to an input shaft 13 of the CVT 2. A holder secured to the driven member 14 carries slip rings 18 which are electrically connected to the coil 15. The coil 15 is supplied through brushes 19 and slip rings 18 with current from a control circuit for the electromagnetic powder clutch.

When the magnetizing coil 15 is excited by the clutch current, driven member 14 is magnetized to produce a magnetic flux passing through the drive member 12. The magnetic powder is aggregated in the gap 16 by the magnetic flux and the driven member 14 is engaged with the drive member 12 by the powder. On the other hand, when the clutch current is cut off, the drive and driven members 12 and 14 are disengaged from one another.

In the CVT 2, the selector device 3 is provided between the input shaft 13 and a main shaft 20. The main shaft 20 is cylindrical and is disposed coaxially with the input shaft 13. The selector device 3 comprises a drive gear 21 integral with input shaft 13, reverse driven gear 22 rotatably mounted on the main shaft 20, and a synchronizer 27 as a synchromesh mechanism, which is mounted on the main shaft 20. The drive gear 21 meshes with one of counter gears 24 rotatably mounted on a shaft 23. Another gear of the counter gears 24 engages with an idler gear 26 rotatably mounted on a shaft 25, which in turn engages with the driven gear 22.

The synchronizer 27 comprises a hub 28 secured to the main shaft 20, a synchronizer sleeve 29 slidably engaged with the hub 28 with splines, and synchronizer rings 30 and 31. The synchronizer sleeve 29 is adapted to engage with splines of the drive gear 21 or with splines of the driven gear 22 through rings 30 or 31.

When the sleeve 29 is engaged with the gear 21, the input shaft 13 is connected to the main shaft 20 through the gear 21 and synchronizer 27 to provide driving positions. When the sleeve 29 is engaged with the gear 22, the input shaft 13 is connected to the main shaft 20 through gears 21, 24, 26 and 22 to provide a reverse driving position.

In the pulleys and belt device 4, the main shaft 20 has an axial passage in which an oil pump driving shaft 42 connected to crankshaft 10 is mounted. An output shaft 35 is provided in parallel with the main shaft 20. A drive pulley 36 and a driven pulley 37 are mounted on the shafts 20 and 35. A fixed conical disc 36a of the drive pulley 36 is integral with the main shaft 20 and an axially movable conical disc 36b is axially slidably mounted on the main shaft 20. The movable conical disc 36b also slides in a cylinder secured to the main shaft 20 to form a servo device 38. A chamber 38a of the servo device 38 communicates with an oil pump 41 through the pressure oil control circuit. The oil pump 41 is driven by the shaft 42.

A fixed conical disc 37a of the driven pulley 37 is formed on the output shaft 35 opposite the movable disc 36b and a movable conical disc 37b is slidably mounted on the shaft 35 opposite disc 36a. The movable conical disc 37b has a cylindrical portion in which a piston portion of the output shaft 35 is slidably engaged to form a servo device 39. A chamber 39a of the servo device 39 is communicated with the oil pump 41 through the pressure oil control circuit. A spring 40 is provided to urge the movable conical disc 37b to the fixed conical disc 37a. A drive belt 34 engages with the drive pulley 36 and the driven pulley 37.

Secured to the output shaft 35 is a drive gear 43 which engages with an intermediate reduction gear 44a on an intermediate shaft 44. An intermediate gear 45 on the shaft 44 engages with a final gear 46. Rotation of the final gear 46 is transmitted to axles 48 and 49 of the vehicle driving wheels through a differential 47.

A hydraulic control circuit is provided to respond to vehicle speed, engine speed and throttle valve position for controlling the oil from the oil pump 41 to servo devices 38 and 39 thereby to move the discs 36b and 37b, as described hereinafter.

Figure 2A:
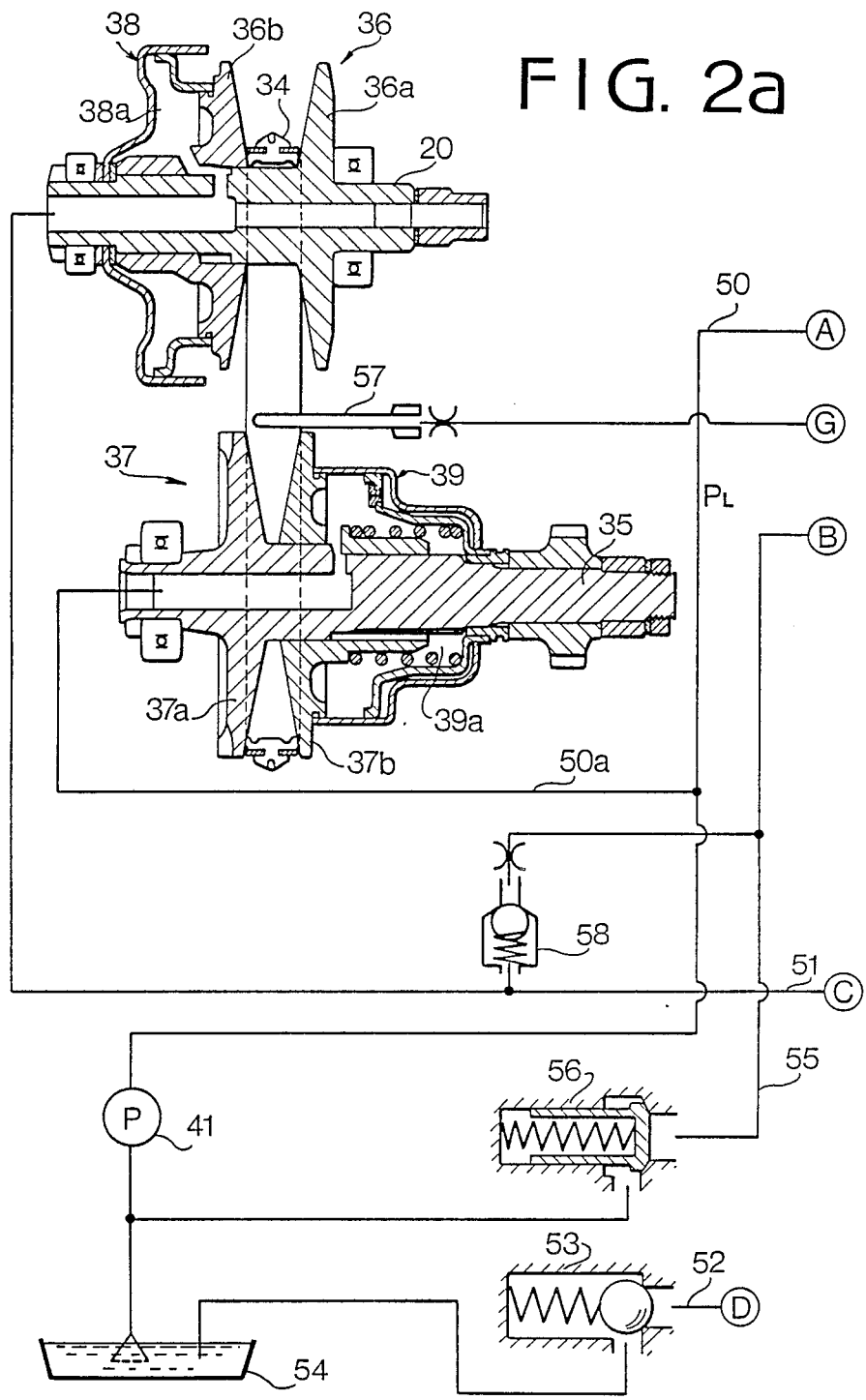
FIGS. 2a and 2b are hydraulic control circuits for the transmission.
Figure 2B:
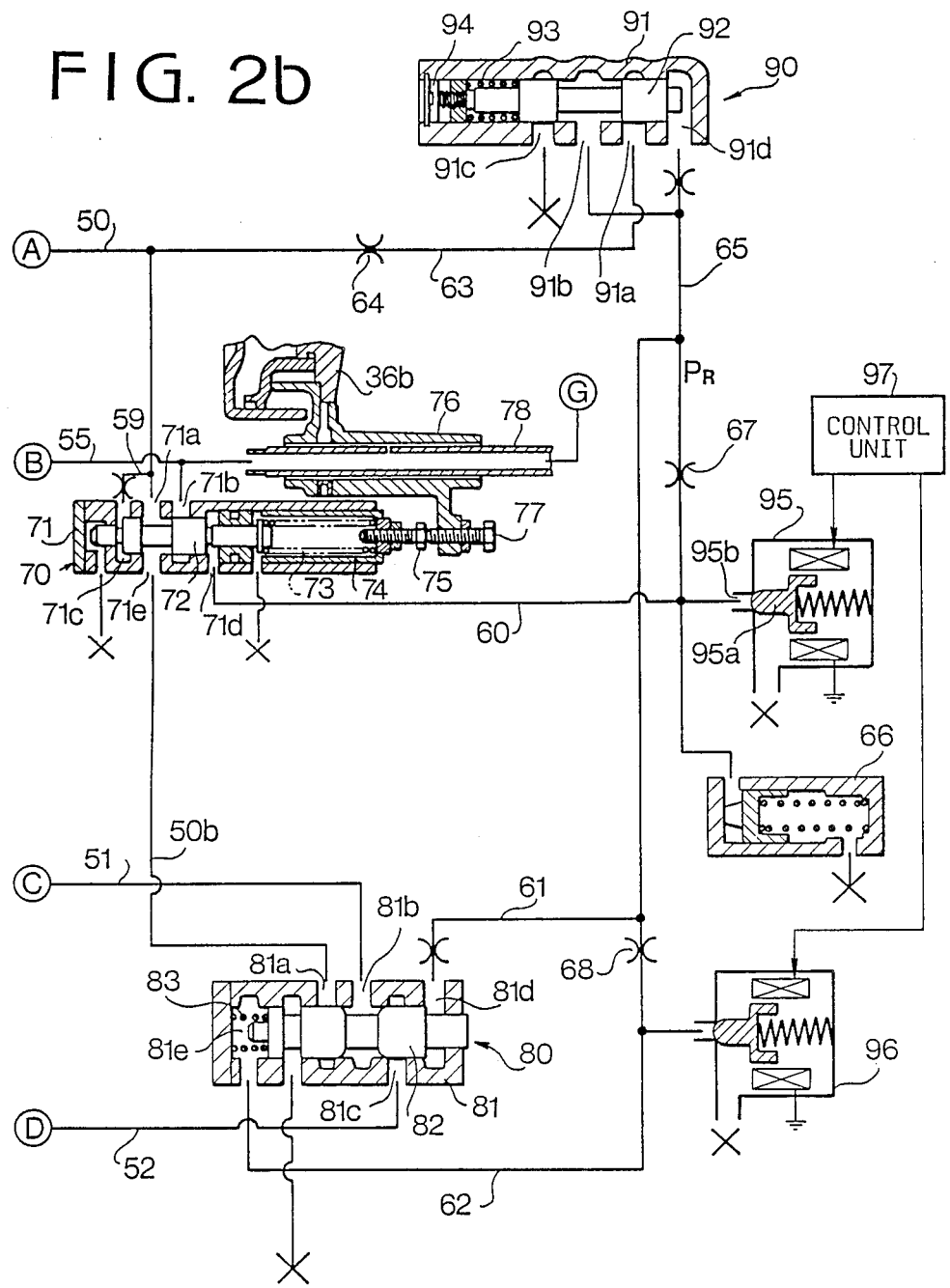

FIGS. 2a and 2b show an example of the hydraulic control circuit. The chamber 39a of the driven pulley 37 is supplied with pressurized oil by the oil pump 41 from an oil reservoir 54 through a line pressure conduit 50a. The chamber 38a of drive pulley 36 is applied with pressurized oil passing through a line pressure conduit 50, ports 71a and 71e of a line pressure control valve 70, passage 50b, transmission ratio control valve 80, and conduit 51. The movable conical disc 36b of the drive pulley 36 is so designed that the pressure receiving area thereof is larger than that of the movable conical disc 37b of the driven pulley 37.

The line pressure control valve 70 comprises a valve body 71, spool 72, and chambers 71c and 71d. The spool 72 is applied with pressure of the pressurized oil in the chamber 71c supplied through a conduit 59. The other end of the spool 72 is applied with the force of a spring 73 provided between the end of the spool 72 and a retainer 74, the position of which is adjustable by a screw 75. The port 71a is communicated with a drain port 71b for a drain passage 55 in accordance with the position of a land of the spool 72. The drain port 71b communicates with oil reservoir 54 through passage 55 and a lubricating oil pressure providing valve 56 in the form of a check valve. The passage 55 is further communicated with conduit 51 through a prefill valve 58. The adjust screw 75 screwed in the spring retainer 74 engages with a screw 77 screwed in a transmission ratio sensing shoe 76 which is slidably mounted on a lubricating oil tube 78. The sensing shoe 76 is slidably engaged with either of the movable conical discs 36b and 37b (disc 36b in the illustrative embodiment), so that the axial movement of the disc 36b is transmitted to the spool 72 through sensing shoe 76, screws 77, 75, spring retainer 74 and spring 73. A part of the oil in the passage 55 is supplied to the belt 34 from a nozzle 57 passing through tube 78 to lubricate the pulley device.

The transmission ratio control valve 80 comprises a valve body 81, spool 82, and spring 83 for urging the spool 82 in the downshift direction. A port 81b of the valve body 81 is selectively communicated with a pressure oil supply port 81a or a drain port 81c in accordance with the position of lands of the spool 82. The port 81b communicates with chamber 38a through conduit 51, and port 81a communicates with line pressure control valve 70 through conduit 50b. The drain port 81c is communicated with the oil reservoir 54 through a conduit 52 and check valve 53.

The system of the present invention is provided with a pressure reducing valve or pressure control valve 90, solenoid operated on-off control valves 95 and 96.

The reducing valve 90 comprises a valve body 91, spool 92, ports 91a, 91b and 91c, and chamber 91d, and spring 93 urging the spool 92 toward the chamber 91d. The load of the spring 93 can be adjusted by a retainer 94. The port 91a is connected to the conduit 50 by a conduit 63 having an orifice 64, and port 91b and chamber 91d are connected to a conduit 65. When the pressure in the conduit 65 reduces, the spool 92 is shifted to the right by spring 93, so that port 91a communicates with port 91b to increase the pressure in the conduit 65. Thus, a constant pressure of oil is provided in the conduit 65.

The conduit 65 is communicated with the chamber 71d of line pressure control valve 70 through an orifice 67 and a passage 60. The conduit 65 is also communicated with reservoir 54 through solenoid operated on-off valve 95 and with an accumulator 66. Further, the conduit 65 is communicated with an end chamber 81d of the transmission ratio control valve 80 through a passage 61 and with another end chamber 81e through a passage 62 having an orifice 68. The solenoid operated on-off valve 96 is connected to the passage 62 downstream of orifice 68 so as to drain the oil to the reservoir 54. The solenoid operated on-off valve 95 is adapted to be operated by pulses. When energized, a valve 95a opens a drain port 95b. The solenoid operated on-off valve 96 is the same as valve 95 in construction and operation. The solenoid operated on-off valves 95 and 96 are operated by pulses from a control unit 97. Thus, control pressures applied to chambers 71d, 81e change by changing the duty ratios of the pulses supplied to the solenoid operated on-off valves 95 and 96.

In the line pressure control valve 70, the relationship among spring load $F_S$ and line pressure $P_L$, line pressure receiving area $S_L$ of the spool, control pressure $P_d$ at the chamber 71d, and control pressure receiving area $S_d$ is as follows:

$$F_S + P_d \cdot S_d = P_L \cdot S_L$$

$$P_L = (P_d \cdot S_d + F_S)/S_L$$

Accordingly, the line pressure $P_L$ is proportional to the control pressure $P_d$.

Figure 3A:
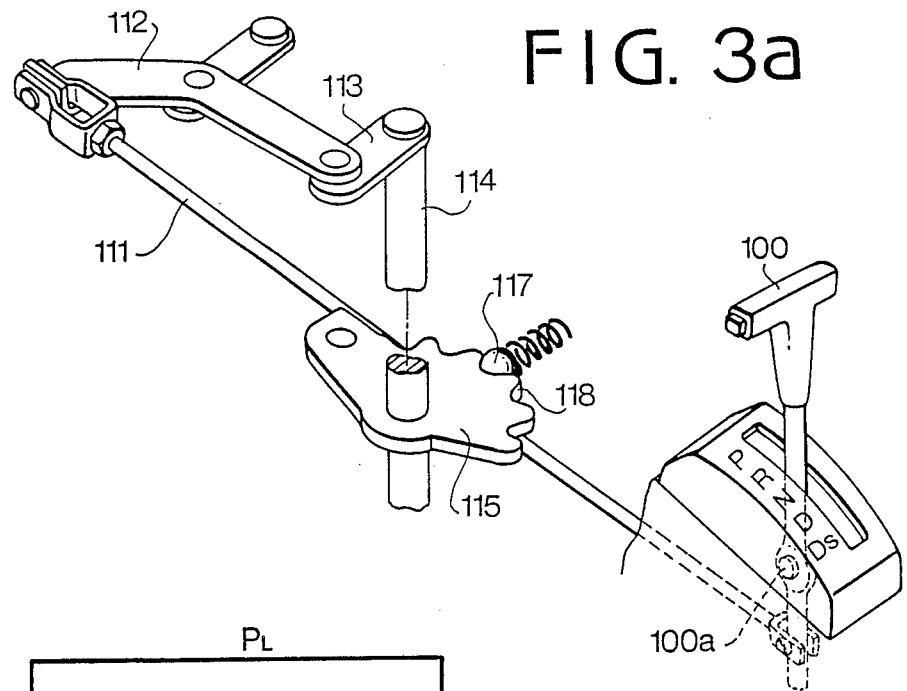
FIG. 3a is a perspective view showing a part of a selector mechanism according to the present invention.

The selector mechanism of the selector device 3 is hereinafter described referring to FIGS. 3a and 3b. As shown in FIG. 3a, a selector lever 100 is rotatably mounted on a shaft 100a and a lower end thereof is operatively connected to a vertical shaft 114 through a rod 111, levers 112 and 113 so as to rotate the shaft 114. A detent plate 115 having five indentations 118 is secured to the shaft 114 and a spring loaded positioning ball 117 engages with the detent plate so as to engage one of the indentations 118 in order to hold the shaft 114 at a selected angular position. The indentations 118 correspond to operational positions of P, R, N, D, and Ds.

Figure 3B:
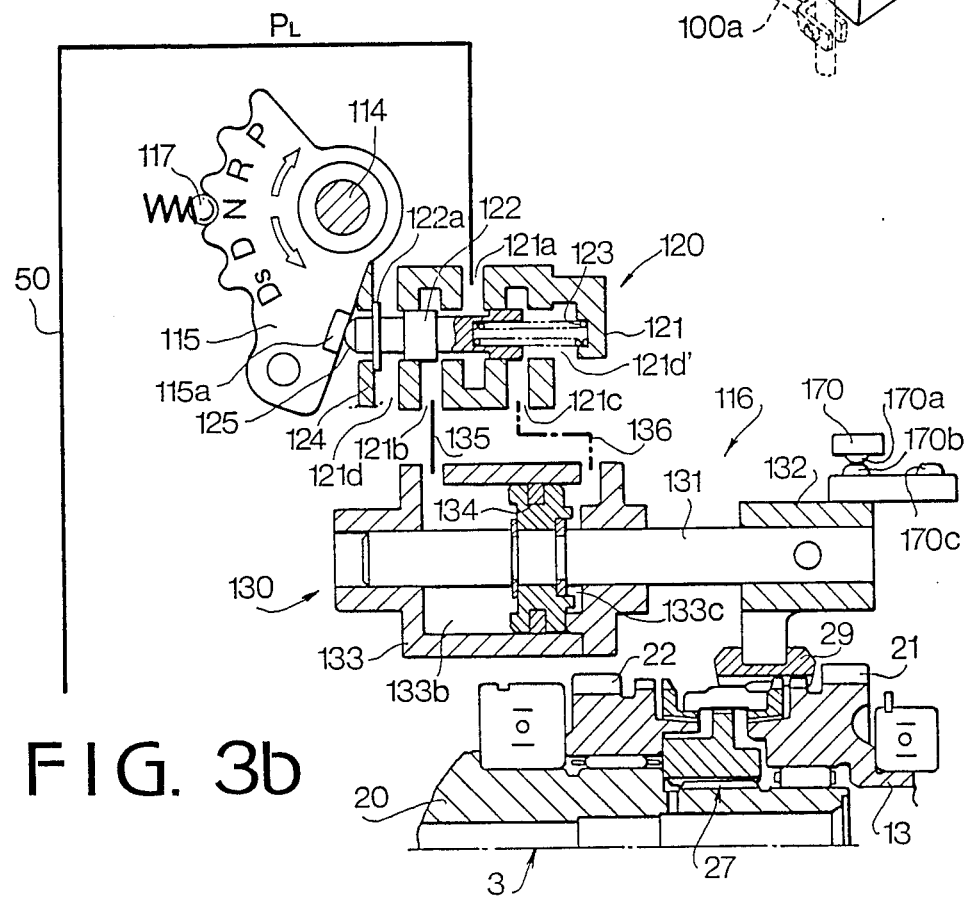
FIG. 3b is a sectional view showing an actuator provided on the selector mechanism.

Referring to FIG. 3b, an actuator 116 for operating the selector device 3 comprises a selector valve 120 and a servo valve 130. The detent plate 115 has a projection 115a for operating the selector valve 120.

The selector valve 120 comprises a valve body 121, a spool 122 having two lands, and return spring 123 urging the spool 122 to the detent plate 115. An end 125 of the spool 122 is engaged with the projection 115a of the detent plate 115, so that the spool 122 is axially moved by the rotation of the detent plate 115. The valve body 121 has an inlet port 121a communicated with the line pressure conduit 50, a pair of outlet ports 121b, 121c, and a pair of drain ports 121d, 121d'. The inlet port 121a is selectively communicated with the outlet port 121b and 121c in accordance with the position of a respective land of the spool 122. A flange 122a is formed on an end portion of the spool 122 to be engaged with a stopper 124 of the valve body 121 for regulating the position of the spool 122 at the left end. For example, when the N range is selected as shown in FIG. 3b, the spool 122 is positioned at the left end where the flange 122a abuts on the stopper 124.

The servo valve 130 comprises a cylinder 133, a rod 131 slidably mounted in the cylinder 133, and a piston 134 securely mounted on the rod 131 in the cylinder 133. The rod 131 is disposed in parallel with the selector device 3. A fork 132 engaging with the synchronizer sleeve 29 of the selector device 3 is secured to the rod 131. The cylinder 133 has a chamber 133b and a chamber 133c defined by the piston 134. The chamber 133b is communicated with the outlet port 121b of the selector valve 120 through an oil passage 135, and the chamber 133c is communicated with the outlet port 121c through a passage 136. Thus, the piston rod 131 can be axially reciprocated by the operation of selector valve 120.

In the present invention, in order to avoid trouble in the selector mechanism at the selection of operational ranges, a shift switch 170 is provided in the servo valve 130 of the actuator 116, as shown in FIG. 3b. The shift switch 170 has a movable contact 170a which is selectively engageable with a dog 170b or 170c. The dogs are formed on a base of the fork 132, and the dog 170b is positioned corresponding to a forward driving position F and a dog 170c is disposed corresponding to a reverse driving position R. When the forward driving position or the reverse driving position is selected by the actuator 116, the switch 170 turns on to produce a shift signal.

Figure 4B:
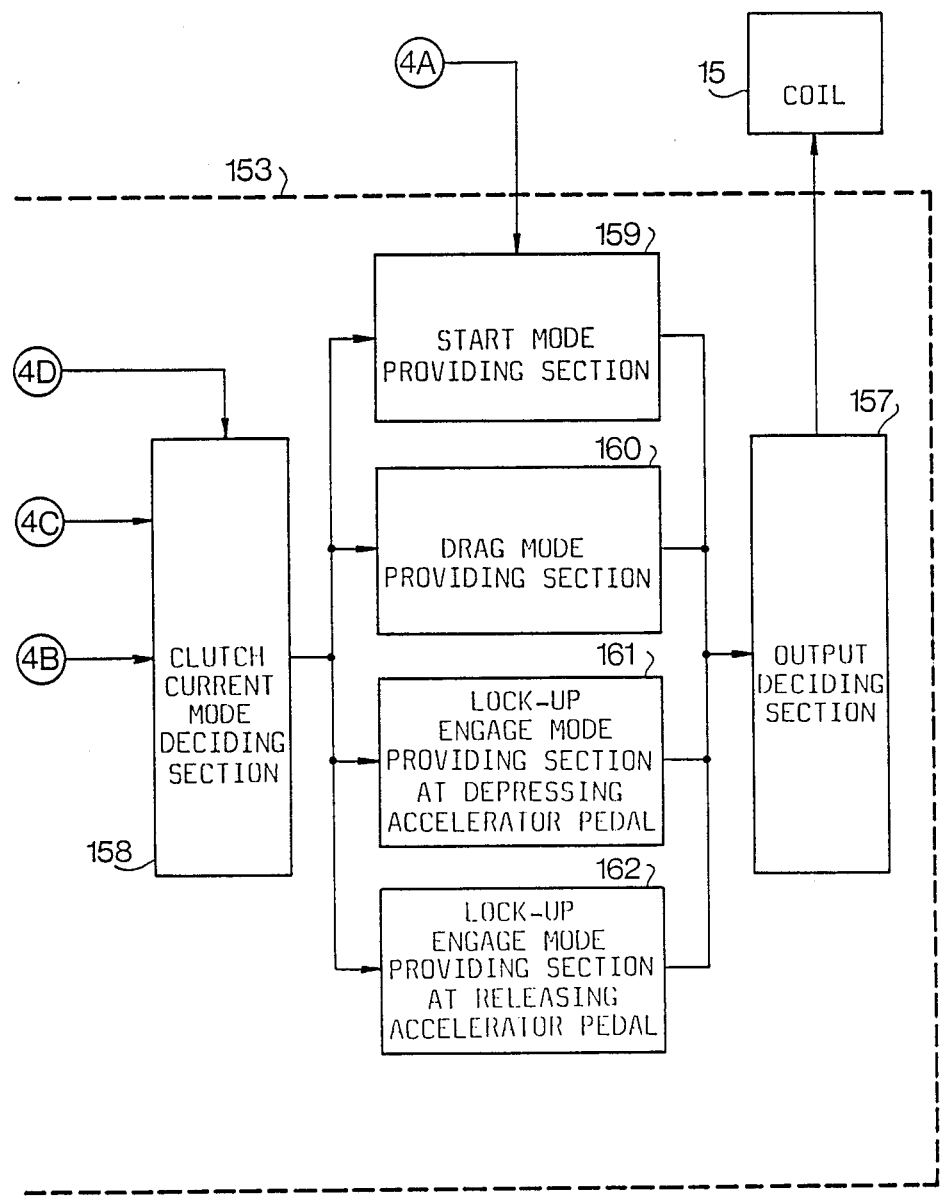

Referring to FIGS. 4a, 4b showing a control system for the clutch 1 according to the present invention, an R-range switch 141, D-range switch 142, and Ds-range switch 143 are provided adjacent the selector lever 100 for detecting respective selected positions. An accelerator pedal switch 145 is provided adjacent an accelerator pedal 144 of the vehicle to produce an output signal at the depression of the pedal, and an accelerator pedal position switch 146 is provided to produce an output signal when the accelerator pedal is depressed over a predetermined degree. A choke switch 147 produces an output signal when a choke valve of the engine is closed, and an air conditioner switch 148 produces an output signal at the operation of an air conditioner. An ignition pulse generator 150 produces pulses dependent on ignition pulses from an ignition coil 149, representing engine speed. A vehicle speed signal generator 152 produces pulses dependent on an output from a speedometer 151. These output signals and pulses are applied to a control unit 153 which controls the clutch current in dependency on the input signals.

The control unit 153 is provided with an engine speed deciding section 154 applied with the ignition pulses from the generator 150, and a vehicle speed deciding section 155 applied with the pulses from the generator 152. A reverse excitation mode deciding section 156 determines that when output signals from the R-range switch 141, D-range switch 142, and Ds-range switch 143 are turned off, the selector lever 100 is at a parking position (P-range) or a neutral position (N-range), and produces one of driving range select signals which means a reverse excitation signal. The reverse excitation signal is applied to an output deciding section 157, so that a small reverse current flows in the coil 15 to excite the coil in reverse. When engine speed is below 300 rpm, an engine speed deciding section 154 produce a low engine speed signal which is applied to the reverse excitation mode deciding section 156 to excite the coil 15 in reverse. The output signals of the accelerator pedal depression switch 145 and vehicle speed decision section 155, and the drive range select signals from the reverse excitation mode deciding section 156 are applied to a clutch current mode deciding section 158 for deciding driving conditions such as starting mode. Output signals are applied to a start mode providing section 159, drag mode providing section 160, clutch lock-up engage mode providing section 161 upon releasing the accelerator pedal, and clutch lock-up engage mode providing section 162 upon depressing the accelerator pedal. Outputs of the sections are applied to the output deciding section 157 to control the clutch current.

The shift switch 170 produces a shift signal which is applied to the start mode providing section 159 for starting the start mode control.

In operation, when the selector lever 100 is shifted along a straight line, the detent plate 115 is rotated about the shaft 114 to operate the selector valve 120. When the N range is selected as shown in FIG. 3b, the inlet port 121a communicates with the outlet port 121b and the outlet port 121c communicates with the drain port 121d'. The line pressure from the conduit 50 is applied to the chamber 133b of the cylinder 133 so that the piston rod 131 is shifted to the right in FIG. 3b.

Thus, the sleeve 29 is moved to the right to engage with the gear 21. Accordingly, the input shaft 13 is connected to the main shaft 20 through the gear 21 and synchronizer 27 to provided a forward driving position. At the forward driving position, the shift switch 170 closes to produce the shift signal.

In the control unit 97 responsive to the N range selection, all of the switches 141, 142 and 143 are turned off, so that the reverse excitation mode is selected. Thus, the reverse excitation mode deciding section 156 produces a reverse excitation signal which is applied to an output deciding section 157, so that a small reverse current flows in the clutch 1 to release the clutch completely from the engine. Accordingly, even if the selector device 3 is in the driving position, the power of the engine is not transmitted to the CVT.

When D range or Ds range is selected from the N range, the detent plate 115 rotates away from the selector valve 120 in the clockwise direction. Accordingly, the spool 122 is not moved, staying in the position of N range. Namely, in N, D and Ds ranges, the selector device 3 is kept in driving state.

When the D-range switch 142, or the Ds range switch 143 is turned on, the reverse excitation mode deciding section 156 produces the drive range select signal which is applied to the clutch current mode deciding section 158 for deciding the start mode, clutch lock-up engage mode, or drag mode in accordance with driving conditions. Thus, the clutch 1 is engaged by the drag current to transmit the engine power to the CVT.

When the R range is selected from the N, D or Ds range, the projection 115a of the detent plate 115 pushes the end 125 of the spool 122 to shift the spool 122 to the right. The inlet port 121 communicates with the outlet port 121c and the outlet port 121b communicates with the drain port 121d, so that the line pressure is applied to the chamber 133c. Thus, the piston rod 131 is shifted to the left in FIG. 3b. The sleeve 29 is moved to the left to engage with the gear 22. Accordingly, the reverse driving position is provided.

When the P range is selected, the selector device 3 remains at the R range position.

In response to the selection N→R, or the selection D→N→R, the R-range switch 141 is turned on. When the accelerator pedal is depressed, the start mode is selected. The output signal of the clutch current mode deciding section 158 is applied to the start mode providing section 159. However, unless the shift switch 170 produces the shift signal, the start mode providing section 159 does not operate.

The selector device 3 is operated to engage the synchronizer 27 with the corresponding gear in a different synchronizing time in accordance with the driving conditions such as the vehicle speed. When the synchronizer 27 engages with the gear, the shift switch 170 turned on to produce the shift signal which is applied to the start mode providing section 159. Thus, the clutch 1 is engaged to start the engine for the reverse driving.

In the selection of R→N, the clutch 1 is released, so that a failure in engagement of the selector device 3 is avoided.

At the selection of R→N→D (or Ds), the clutch is engaged in the same manner as the afore-mentioned manner.

Figure 5:
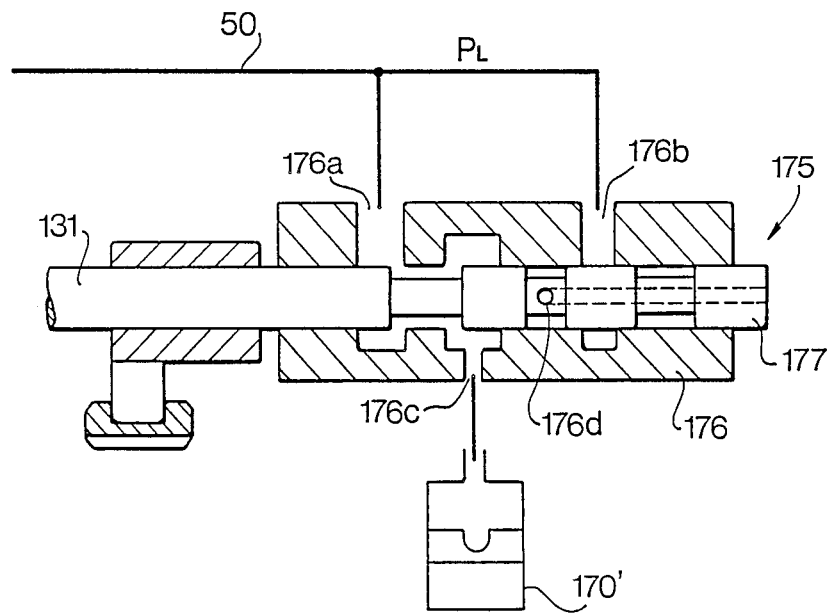
FIG. 5 is a sectional view showing another embodiment of the present invention.

Referring to FIG. 5 showing another embodiment of the shift switch, a position detecting valve 175 is provided on the piston rod 131 of the servo valve 130.

The position detecting valve 175 comprises a valve body 176, a spool 177 connected to the rod 131. The valve body 176 has inlet ports 176a, 176b communicated with the line pressure conduit 50, a port 176c connected to a hydraulically operated shift switch 170', and a drain port 176d for the shift switch 170'. When the synchronizer engages with the corresponding gear for providing either of the forward driving position or the reverse driving position, the port 176c is communicated with the inlet port 176a or 176b. Thus, the line pressure is applied to the shift switch 170' to turn on the switch 170'.

The operation of the CVT during the driving of the vehicle is the same as the system of the afore-mentioned EP-A-0151024. Therefore, the description of the operation is omitted.

From the foregoing, it will be understood that the present invention provides a selector mechanism in which a clutch is engaged after the selector mechanism is engaged by an actuator. Thus, the trouble in the selector mechanism at the selection of operational ranges is avoided.

While the presently preferred embodiments of the present invention have been shown and described, it is to be understood that this disclosure is for the purpose of illustration and that various changes and modifications may be made without departing from the spirit and scope of the invention as set forth in the appended claims.

What is claimed is:

1. In a control system for a selector device mounted on a transmission of a motor vehicle having a clutch selectively transmitting power of an engine to the transmission through the selector device, a pressure source for producing pressurized oil to control the transmission, the selector device including a synchronizer for transmitting the power through the clutch in selectively switched opposite rotational directions for forward and reverse driving respectively at engaged positions corresponding to forward and reverse driving positions, respectively, and a selector lever operative to select one of the forward and reverse driving positions, the improvement in the control system comprising hydraulic actuating means for selectively actuating the selector device in response to operating positions of the selector lever comprising a selector valve communicating with the pressurized oil for selectively communicating one of oil passages for the forward and reverse driving positions, respectively, with the pressurized oil in response to the operating positions of the selector lever and a servo valve responsive to the pressurized oil through the selected oil passage, the servo valve including a rod moved by the pressurized oil for actuating the selector device, the rod being operatively connected with the synchronizer, and detecting means mounted on the rod for detecting one of the engaged positions of the selector device and for producing a shift signal for starting of an engaging condition of the clutch so as to positively engage the synchronizer in spite of an existence of delay time within the selector device including the hydraulic actuating means, by detecting of actuated position of the rod moved by the pressurized oil, said detecting means comprises a shift switch, said shift switch is a hydraulically operated shift switch, and said detecting means further comprises a position detecting valve having a valve body and a spool displaceable therein and connected to said rod and communicatable with oil passages connected to said shift switch.

2. The control system according to claim 1, wherein the clutch is an electromagnetic clutch.

3. The control system according to claim 1, wherein said selector device is operatable to engage the synchronizer with corresponding gears in different synchronizing time in accordance with driving conditions.

4. The control system according to claim 3, wherein said driving conditions include vehicle speed.

* * * * *